(12) United States Patent
Harder et al.

(10) Patent No.: US 7,406,797 B2
(45) Date of Patent: Aug. 5, 2008

(54) SUPER HIGH FLOATING LINE

(75) Inventors: John Harder, Idaho Falls, ID (US);
Marlin Roush, Idaho Falls, ID (US);
John Schultz, Shelley, ID (US);
Timothy Moon, Shelley, ID (US)

(73) Assignee: Rio Products Intl., Inc. ID (US)

( * ) Notice: Subject to any disclaimer, the term of this patent is extended or adjusted under 35 U.S.C. 154(b) by 0 days.

(21) Appl. No.: 11/213,588

(22) Filed: Aug. 26, 2005

(65) Prior Publication Data

US 2006/0048440 A1   Mar. 9, 2006

Related U.S. Application Data

(60) Provisional application No. 60/608,453, filed on Sep. 9, 2004.

(51) Int. Cl.
*A01K 91/00* (2006.01)
*D02G 3/00* (2006.01)

(52) U.S. Cl. .................. 43/44.98; 428/372; 428/375; 428/373; 428/394; 428/395

(58) Field of Classification Search ............... 43/44.98; 428/375, 373, 374, 379, 395, 394
See application file for complete search history.

(56) References Cited

U.S. PATENT DOCUMENTS

| | | | |
|---|---|---|---|
| 2,797,201 A * | 6/1957 | Veatch et al. ............. | 521/57 |
| 2,862,282 A | 12/1958 | Beebe | |
| 3,043,045 A | 7/1962 | Martuch | |
| 3,486,266 A | 12/1969 | Howald et al. | |
| 3,523,034 A * | 8/1970 | Howald ............. | 428/389 |
| 3,849,929 A | 11/1974 | Martuch | |
| 3,868,785 A | 3/1975 | Foote | |
| 3,914,480 A * | 10/1975 | Lang ................ | 428/395 |
| 3,975,194 A | 8/1976 | Farnand et al. | |
| 4,021,589 A | 5/1977 | Copley | |
| 4,048,744 A | 9/1977 | Chandler | |
| 4,386,132 A | 5/1983 | Dille et al. | |
| 4,482,590 A | 11/1984 | Bouley et al. | |
| 5,207,732 A | 5/1993 | Stark | |
| 5,296,292 A | 3/1994 | Butters | |
| 5,437,900 A | 8/1995 | Kuzowski | |
| 5,625,976 A | 5/1997 | Goodale | |
| 5,659,994 A * | 8/1997 | Cutter et al. ........... | 43/44.98 |
| 5,879,758 A | 3/1999 | Goodale | |
| 6,167,650 B1 | 1/2001 | Duback | |
| 6,321,483 B1 | 11/2001 | Kauss et al. | |

OTHER PUBLICATIONS

Expancel Microspheres—An Introduction (23 pages).
3M Material Safety Data Sheet—(7 pages); Aug. 14, 2002.

* cited by examiner

*Primary Examiner*—Jill Gray
(74) *Attorney, Agent, or Firm*—Mark Montague; Cowan, Liebowitz & Latman, P.C.

(57) ABSTRACT

Fly fishing lines and methods for manufacturing fly fishing lines entail the use of polymer microspheres within the fly line coating to produce lines with very low specific gravities. The fly lines have single or multiple coatings. In fly lines having multiple coatings, the inner coating includes polymer microspheres and the outer coating include either polymer microspheres or glass microspheres.

4 Claims, 8 Drawing Sheets

SUPER HIGH FLOATING LINE

RELATED APPLICATION

This application claims the benefit of U.S. Provisional Application Ser. No. 60/608,453, filed Sep. 9, 2004. The disclosure of U.S. Provisional Application Ser. No. 60/608,453 is incorporated herein by reference.

BACKGROUND OF THE INVENTION

1. Field of the Invention

This invention relates to a super high floating line for use in fly fishing and related activities, as well as a method of manufacturing a super high floating line.

2. Description of the Related Art

Generally, it is greatly desirable to utilize a line while fly fishing that has a relatively low specific gravity. The lower the specific gravity, the higher the line floats since less water is displaced. Currently available fly fishing lines have specific gravities in the range of 0.85 to 0.95. Various fly fishing lines have coatings that typically are comprised of polyvinyl chloride polymer or urethane that include respectively glass microspheres or gaseous filled cells, dispersed throughout the coating to impart floatability by reducing the specific gravity to less than 1.00, usually somewhere between 0.85 and 0.90. Currently, the glass microspheres utilized within the lines, such as Minnesota Mining and Manufacturing Company's G18/500 Microspheres, as well as chemical blowing agents that produce gas filled cells, do not provide for the manufacture of fly fishing lines with specific gravities less than 0.80.

Today, the fly fishing angler continues to seek fly fishing lines that float higher, have a lower specific gravity, are more durable, are more supple and perform better than currently available lines. As is well known, a fly fishing line that features a very low specific gravity floats higher on the surface of the water thus allowing the angler to pick the fly line up off the water with greater ease. When the tip of the fly fishing line sinks, initiating a cast is difficult since greater energy must be applied to the line throughout the rod in order to remove the line from the water. A low specific gravity thus allows the fly line to float higher on the surface of the water thereby decreasing surface tension and friction off the water when initiating a cast. Additionally, a fly fishing line with a high floating tip reduces the occurrence of the butt of a nylon leader attached to the high floating tip of the fly line from sinking. When the leader butt sinks, it submerges the tip of the fly fishing line making initiating the cast more difficult due to the increased friction created by the leader being pulled up through the water column. Furthermore, the tip of a high floating line is easier to see thus making it easier for the angler to detect a fish taking the fly when fishing subsurface flies.

In addition, it is desirable to provide a fly fishing line that is more supple, has less memory and is resistant to coiling in cold weather and in typical water conditions. The coils of a stiff line can penetrate the surface and be pulled down into the water column water negatively affecting the floatation of the line.

Improvements to fly fishing lines continue. Various examples include those described in U.S. Pat. Nos. 3,868,785; 5,207,732; 5,296,292; 5,437,900; 5,625,976; 6,167,650; and U.S. Pat. No. 6,321,483, the disclosures of which are hereby incorporated herein by reference. However, further improvements are desired.

OBJECTS AND SUMMARY OF THE INVENTION

Therefore, it is an object of the present invention to provide a fly fishing line with a specific gravity lower than currently available designs.

It is another object of the present invention to provide a fly fishing line with a lower specific gravity that is also more durable, more supple and has less memory than currently available designs.

In accordance with the present invention, a fly fishing line is comprised of a core, and a coating having a plurality of polymer microspheres disposed around the core.

As an aspect of the present invention, the fishing line has a specific gravity lower than 0.85. In other variations, the fishing line has a specific gravity lower than 0.8.

As another aspect of the present invention, the fishing line includes a floating tip having a specific gravity lower than 0.7.

As a further aspect of the present invention, the concentration of microspheres within the coating is between 1 and 10% by weight.

As an additional aspect of the present invention, the coating is a PVC plastisol, and the amount of polymer microspheres in the coating is less than 5% by weight.

As yet another aspect of the present invention, the coating has a specific gravity of substantially equal to or less than 0.8 and a viscosity of under 100,000 centistokes at 2.5 RPM.

In accordance with another embodiment of the present invention, a fishing line comprises a core, a first coating having a plurality of polymer microspheres disposed around the core, and a second coating disposed around the first coating.

As an aspect of this embodiment, the second coating has a plurality of microspheres of a preselected material.

As another aspect of this embodiment, the microspheres in the second coating are different from the microspheres in the first coating.

As a further aspect of this embodiment, the second coating has a plurality of glass microspheres.

As an additional aspect of this embodiment, the second coating has a plurality of polymer microspheres, and viscosities of the first and second coatings are substantially different.

As yet another aspect of this embodiment, the first and second coatings contain a fused interface.

As yet a further aspect of this embodiment, the first coating is disposed around first and second portions of the core, the second coating is disposed around that portion of the first coating disposed around the first core portion, and the fishing line includes a third coating disposed around that portion of the first coating disposed around the second core portion, wherein the second and third coatings are different.

As a feature of this aspect, the second coating includes polymer microspheres, and the third coating includes glass microspheres.

As yet an additional aspect of this embodiment, a running line portion of the fishing line has a diameter of substantially between 0.035 and 0.045 inches and a specific gravity of less than 0.85.

As still yet another aspect of this embodiment, a floating tip portion of the fishing line has a diameter of substantially equal to or less than 0.045 inches and a specific gravity of less than 0.7.

As still yet a further aspect of this embodiment, a body portion of the fishing line has a diameter of substantially between 0.045 and 0.115 inches and a specific gravity of less than 0.85.

As still yet an additional aspect of this embodiment, the fishing line has a slickness corresponding to, as measured using a tensile tester with a 10 kilogram load cell, less than 0.3 pounds of force required to pull a 0.05 inch diameter fishing line having a 0.123 pound attached weight over a 7 inch diameter chrome plate wheel at a rate of 10 inches per minute, the line having a surface contact length of 22 inches to the wheel.

In accordance with a further embodiment of the present invention, a method of manufacturing a fishing line includes adding polymer microspheres to a base coating, and coating a core with the base coating containing the added polymer microspheres.

Aspects and features of this embodiment are similar to various aspects and features mentioned above In accordance with an additional embodiment of the present invention, a method of manufacturing a fishing line includes providing a core, disposing a first coating having a plurality of polymer microspheres around the core, and disposing a second coating around the first coating.

As an aspect of this embodiment, the two disposing steps are carried out to provide a fused interface between the first and second coatings.

As another aspect of this embodiment, the first coating disposed around the core is partially cured so that the second coating is disposed around a partially cured first coating.

As another aspect of this embodiment, the shape of the partially cured first coating is sufficiently maintained while the second coating is disposed over the first coating.

Other aspects and features of this embodiment are similar to various aspects and features mentioned above.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS OF THE INVENTION

In accordance with the present invention, a super high floating fly fishing line (also called, for convenience, "fly line" or "line" herein) is comprised of a core and one or more coatings disposed over the core, and preferably has a specific gravity of less than 0.85 or 0.80, as described below.

Figure 1:
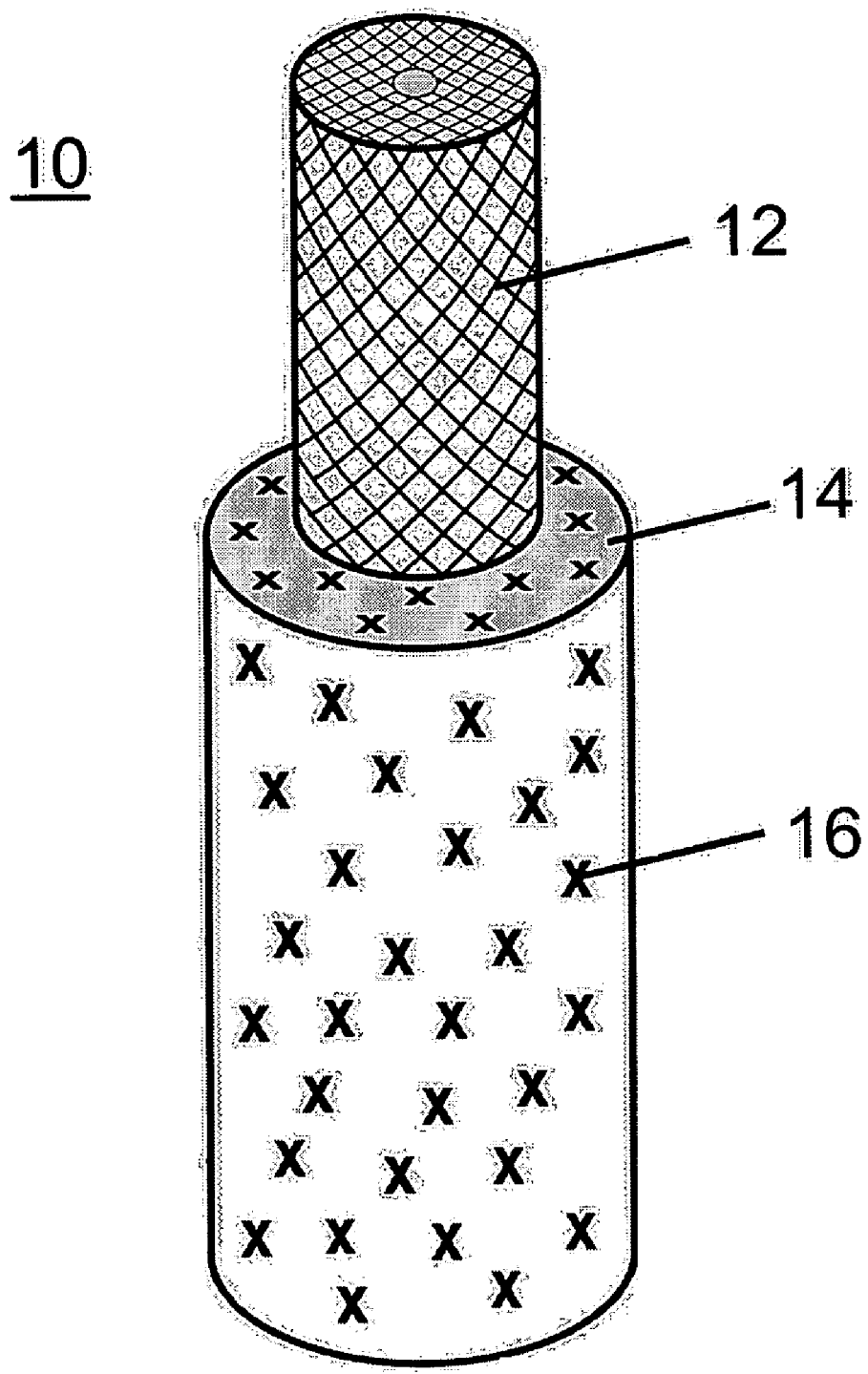
FIG. 1 is a schematic illustration of a fly line in accordance with a first embodiment of the present invention.

Referring to the drawings and particularly to FIG. 1 thereof, a fly line in accordance with a first embodiment of the invention is schematically shown. As shown, fly line 10 is comprised of an inner core 12 and an outer coating 14 disposed over the core. Core 12 is made of one or more filaments, such as a nylon monofilament or a nylon braided multifilament, which are well known. Core 12 may be made of other suitable materials. Outer coating 14 preferably is a PVC plastisol, but may be made of other suitable materials such as polyurethane.

In accordance with the present invention, coating 14 includes microspheres 16 (shown as "X"s in FIG. 1) dispersed throughout the coating, with each microsphere 16 comprising a polymer shell that encapsulates a small amount of a hydrocarbon gas (also called "polymer microspheres" herein). Each polymer microsphere 16 thus features a small amount of a hydrocarbon gas encapsulated in a gastight thermoplastic (polymer) shell. Examples of suitable gas filled microspheres with polymer shells suitable for use in the present invention are those sold under the product name EXPANCEL (type DE) by Expancel Inc., of Duluth, Ga., a division of AKZO NOBEL.

During manufacture of fly line 10 of the present invention, microspheres 16 are added to the PVC plastisol to produce outer coating 14. The polymer microspheres are heated, causing the thermoplastic shell of each sphere to soften and the pressure of the gas inside the shell to increase. As the shells soften and the pressure within each shell increases, the polymer microspheres dramatically expand which in turn decrease their density. Although not preferred, unexpanded polymer microspheres may be employed.

Microspheres 16 are added to the plastisol preferably at a concentration of between 1 and 10% by weight based on the total weight of the plastisol. The added polymer microspheres should be of very small particle size, for example, particle sizes smaller than 55 microns. The product EXPANCEL 091 DE 40 d30 has an average particle size of 35 to 55 microns and a true density of 0.03 grams per cubic centimeter, and thus is well suited for use in the present invention.

When polymer microspheres 16 are included within the fly line's coating 14, the overall floatability of the fly line is substantially increased. As further described below, the inclusion of polymer microspheres 16 in coating 14 enables for the manufacture of fly lines that have a specific gravity of less than 0.85, as well as fly lines with a specific gravity of less than 0.80. Fly line 10 may be manufactured using the well known vertical pulltrusion process. Other processes may be utilized, such as the known horizontal extrusion.

During manufacture, the core of the line is pulled through an open bath containing a liquid adhesive that bonds the coating to the core. The adhesion of the coating to the core is important and directly affects the durability of the line. A poor bond between the coating and the core will cause the coating of the line to crack prematurely. From the adhesive bath the line passes through a primer oven to cure the adhesive. The adhesive coated core then passes through an open bath located under the cure oven that contains the liquid PVC plastisol that includes various additives such as silicone and microspheres. The plastisol adheres to the core and then goes through a computer controlled variable oriface die that forms the taper and scrapes off the excess plastisol. The excess plastisol runs back into the bath. Once the plastisol is applied to the core and the taper is formed, the line goes through the cure oven to cure the plastisol so that the coating is no longer a liquid but, rather, a flexible solid. From the oven, the finished line is wound in a skein ready for inspection and packaging.

Figure 2:
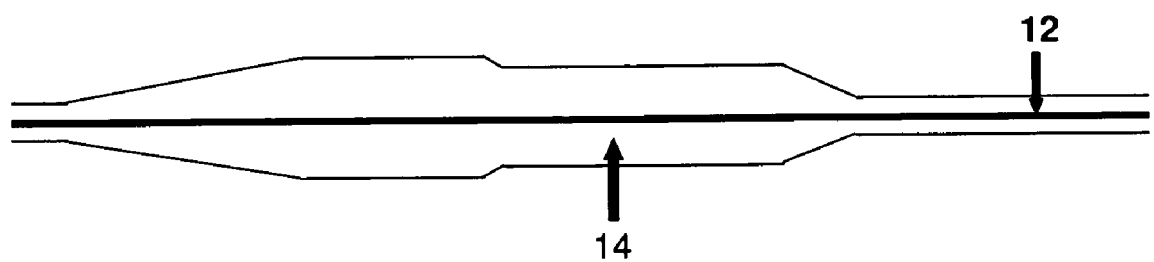
FIG. 2 is another schematic illustration of a fly line manufactured in accordance with the first embodiment.

FIG. 2 schematically illustrate a more typical fly line in accordance with the present invention, containing core 12 and outer coating 14, which contains the polymer microspheres 16 (microspheres not shown in FIG. 2).

U.S. Pat. No. 6,321,483, mentioned above, and which is incorporated by reference herein, teaches the addition of glass microspheres to the plastisol of a fly line's outer coating to impart floatability to the line. In that patent, G18/500 glass microspheres, manufactured by Minnesota Mining and Manufacturing Co., which have an average particle size of 30 microns and a true density of 0.18 grams per cubic centimeter, are used to produce fly lines having improved floatability as compared to previously manufactured fly lines. However, glass microspheres have their limitations and do not, by themselves, enable the manufacture of practical fly lines that have specific gravities of 0.80 and lower.

For example, in order to manufacture a fly line whose specific gravity is less than 0.80 using glass microspheres, a high concentration of glass microspheres (e.g., whose total density is 0.18 grams per cubic centimeter) must be added to the coating formulation. Such concentration, however, would result in a substantial increase in the viscosity of the coating formulation and would also result in a substantial reduction in the formulation's durability, two unacceptable characteristics. In particular, a PVC plastisol with a substantially increased viscosity would be detrimental to the manufacturing process, and the integrity of the coating would be compromised due to its reduction in durability. Hence, fly lines with specific gravities of less than 0.80 using glass microspheres are not manufactured.

In accordance with the present invention, the addition of polymer microspheres (e.g., having a total density of 0.03 grams per cubic centimeter), as discussed above, to the plastisol to produce the fly line's outer coating enables the manufacture of fly lines with specific gravities of less than 0.80 without the above-mentioned detrimental affects that result from using glass microspheres. One sixth the concentration (volume) of polymer microspheres are needed, as compared to the concentration of glass microspheres needed, to achieve these low specific gravities. Viscosity and durability of the plastisol are not meaningfully affected by the addition of the polymer microspheres at the required concentrations.

The following test data compares a fly line with an outer coating having polymer microspheres made in accordance with the present invention to a fly line with an outer coating having glass microspheres. During testing, the Expancel 091DE polymer microspheres were used as the polymer microspheres 16, and 3M's G18/500 glass microspheres were used in the other fly lines. Based on 7000 gram batches of uncured PVC plastisol fly line coating, the plastisol manufactured in accordance with the present invention had 161 grams (2.3% by weight) of the polymer microspheres to produce a coating having a specific gravity of 0.69. However, greater than 900 grams (11% by weight) of glass microspheres were required to produce a coating with the same specific gravity. Thus, 75% less polymer microspheres were required to achieve the same specific gravity as the glass microspheres.

Moreover, for the plastisol batches described above, the viscosity of the polymer microspheres plastisol batch was 93,760 Centistokes at 2.5 RPM, whereas the glass microspheres plastisol batch had a viscosity of 173,800 Centistokes at 2.5 RPM. The viscosities of both plastisol batches were measured using a Brookfield Model RTV Viscometer. As is well known in the art, plastisol batches whose viscosity is greater than 100,000 Centistokes at 2.5 RPM result in serious manufacturing difficulties using the vertical pulltrusion manufacturing process and, thus, plastisol viscosities of less than 100,000 are used.

In addition to producing a coating formulation with a desirable viscosity and a desirable, non-reduced durability, the use of polymer microspheres advantageously provides for a reduced stiffness coating. As mentioned above, substantially fewer polymer microspheres are needed to produce a desired specific gravity, as compared to the amount of glass microspheres needed. With fewer polymer microspheres, a more supple fly line is produced. As is well known, a supple line handles better in colder conditions and causes less "drag" on the fly, i.e., permits the fly to float freely, as if unattached to a line (which makes it more convincing to fish). Still further, polymer microspheres are more flexible than glass microspheres, resulting in lower stifffiess. As is well known, less stiffness results in a fly line with less memory, which is the tendency for the line to remain coiled when removed from a fly reel. Reduced stiffness also is particularly desirable during coldwater fly fishing.

As discussed above, the use of polymer microspheres in the outer coating formulation improves floatability by producing fly lines with specific gravities of less than 0.80. Improved floatability has been seen in both laboratory and field testing as a result of the inclusion of expanded and unexpanded polymer microspheres into the fly line coating. Fly lines with floating tips with specific gravities of less than 0.60 have been achieved. Specific gravities were measured using a Pyknometer manufactured by Thomas Scientific. For fly lines with specific gravities of 0.80 and higher, the known MAD (Methyl Alcohol Density) Test may be used, where the coating is suspended in methyl alcohol. As is known, the specific gravity of the line is ascertained by multiplying the specific gravity of methyl alcohol (0.7922) by the weight of the line in air which is divided by the difference between the weight of the line in air and the weight of the line in methyl alcohol. For fly lines with specific gravities of between 0.66 and 0.80, specific gravity may be ascertained by weighing the line in hexane, whose specific gravity is 0.66, rather than methyl alcohol using the same procedures noted above.

Figure 3:
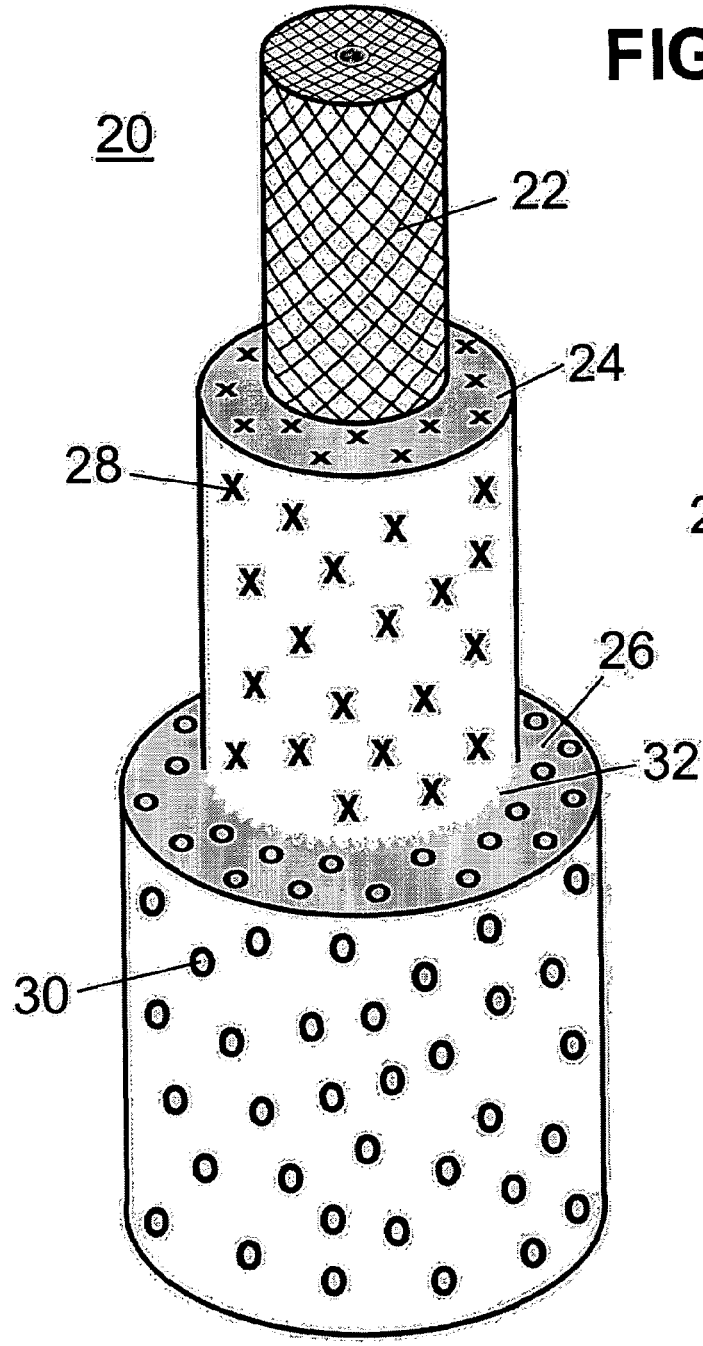
FIG. 3 is a schematic illustration of a fly line in accordance with a second embodiment of the present invention.
Figure 4:
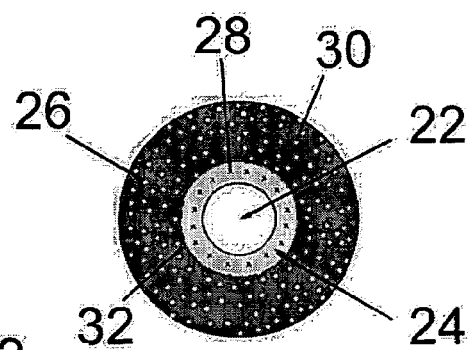
FIG. 4 is a schematic illustration showing a cross-sectional view of the fly line shown in FIG. 3.

Referring now to FIGS. 3 and 4 of the drawings, a fly line in accordance with a second embodiment of the invention is schematically shown. FIG. 3 is a perspective schematic illustration of fly line 20 shown with various layers partially removed, and FIG. 4 is a cross-sectional view of fly line 20. Fly line 20 has a core 22, an inner coating 24 disposed over core 22, and an outer coating 26 disposed over inner coating 24.

Like core 12 in the first embodiment, core 22 is made of one or more filaments, preferably a nylon monofilament or a nylon braided multifilament. Inner coating 24 (also called "first coating" or "first inner coating") preferably is a PVC plastisol. Outer coating 26 (also called "second coating" or "second outer coating") also preferably is a PVC plastisol.

In accordance with the present invention, the PVC plastisol of inner coating 24 includes polymer microspheres 28 (shown as "X"s in FIGS. 3 and 4)), that is, the previously described microspheres with hydrocarbon encapsulated in a gastight thermoplastic shell. The outer coating 26 includes glass microspheres (shown as "O"s in FIGS. 3 and 4), such as those described in U.S. Pat. No. 6,321,483, mentioned above.

During manufacture of fly line 20 of the present invention, inner coating 24 and outer coating 26 are fully cured simultaneously, resulting in a fusion interface 32 between the two coatings. As a result of the two coatings fusing together during curing, becoming an integral coating, enhanced durability and structural integrity are achieved.

Figure 5:
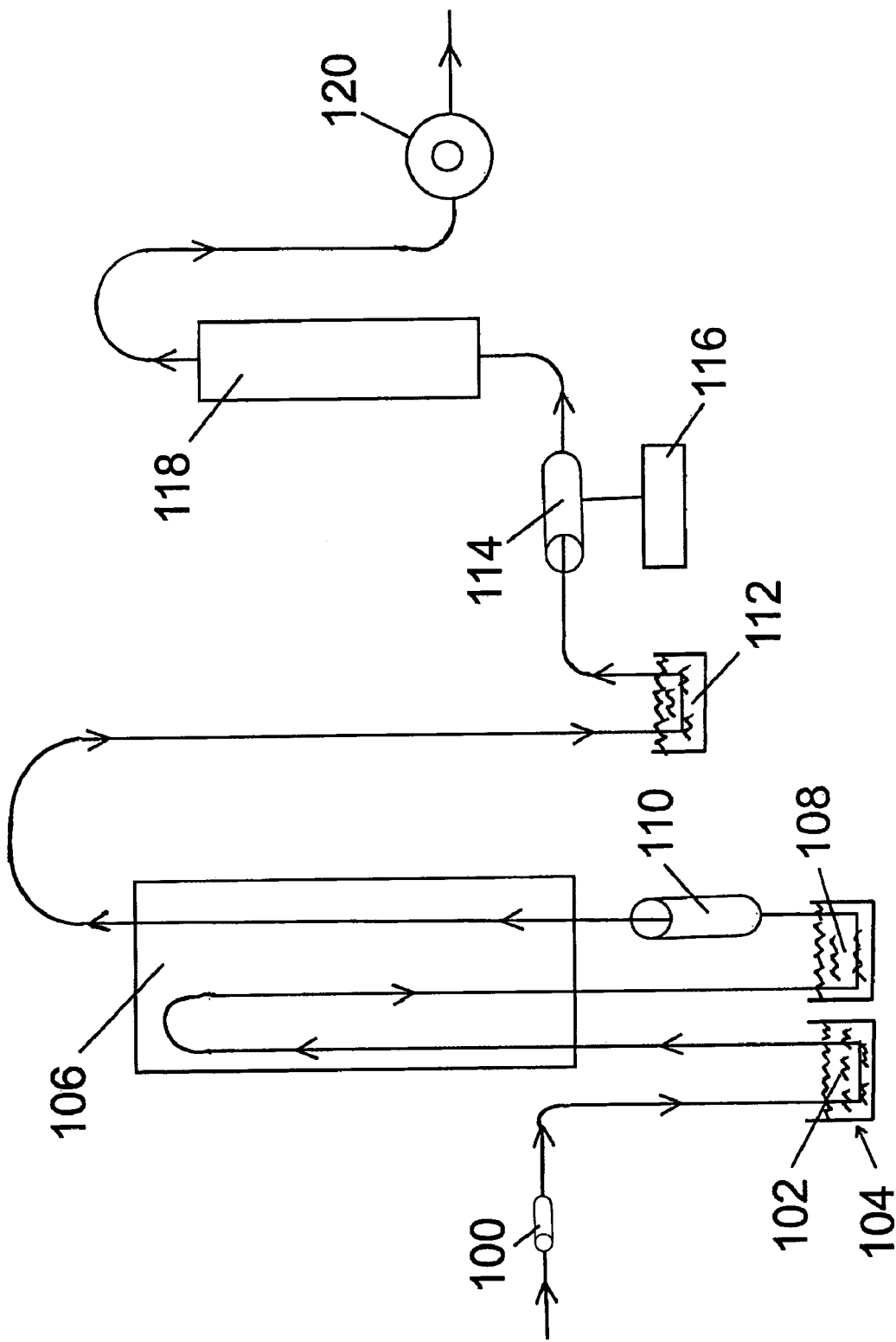
FIG. 5 is a diagram useful in explaining the process of manufacturing a two coat line in accordance with the present invention.

In a particular embodiment, fly line 20 of the present invention is manufactured in accordance with the below-described novel process. With reference to FIG. 5 of the drawings, the various steps are carried out. (1) Core 100 is pulled through an open bath 102 containing a liquid adhesive 104 that bonds the coating to the core. (2) The line then passes through a primer oven 106 to cure the adhesive. (3) As the line exits the bottom of primer oven 106, it passes through a bath 108 containing liquid PVC plastisol that contains additives, including polymer microspheres and silicone. (4) After the PVC plastisol is applied to the line, the line goes through a fixed oriface die 110 that preferably forms an inner coating having a non-varying thickness of 0.003 inches. The line then goes back through primer oven 106 and is partially cured. During this curing, the primer oven has a temperature of about 220 degrees Fahrenheit, which is lower than the fully cure temperature of PVC plastisol (about 380 degrees Fahrenheit). At this point, the inner coating is sufficiently cured to retain its shape (i.e., diameter). (5) The line, now with a partially cured PVC inner coating, goes from the primer oven through an outer coating PVC plastisol bath 112. (6) After applying the outer coating, the line goes through a variable oriface die 114. The variable orifice die, preferably controlled by a computer 116, forms a tapered outer coating. (7) The line, now having both inner and outer coatings, is fully cured in a cure oven 118. The line is formed into a skein 120.

In accordance with the present invention, the inner coating is only partially cured at the time the outer coating is applied. As mentioned above, the partially cured inner coating retains its shape, although it is not fully cured. Since the inner coating is not fully cured, the inner and outer coatings are fused together in the cure oven, which fully cures both coatings. As mentioned above, fusion of the two layers increases the line's durability.

Figure 6:
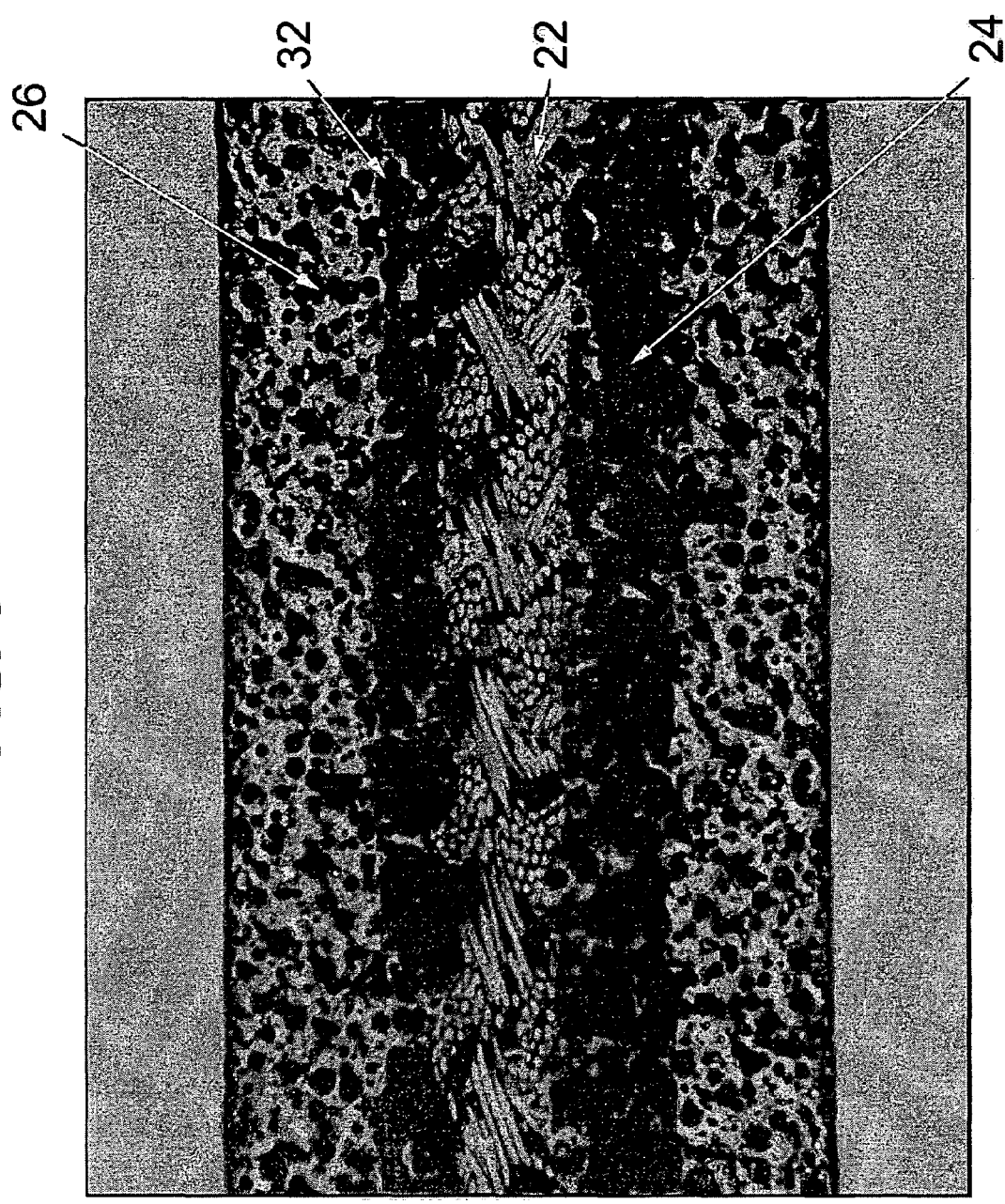
FIG. 6 is a photograph, with 50× magnification, of a longitudinal cross section of the fly line manufactured by the process described with reference to FIG. 5.

FIG. 6 is a photographic image, 50× magnification, of a longitudinal cross section of fly line 20, showing the fly line's core 22, inner coating 24, outer coating 26 and the fusion interface 32. Although not preferred, it is possible to fully cure each layer separately, in two separate operations, but the layers will not fuse as well.

Figures 7, 8:
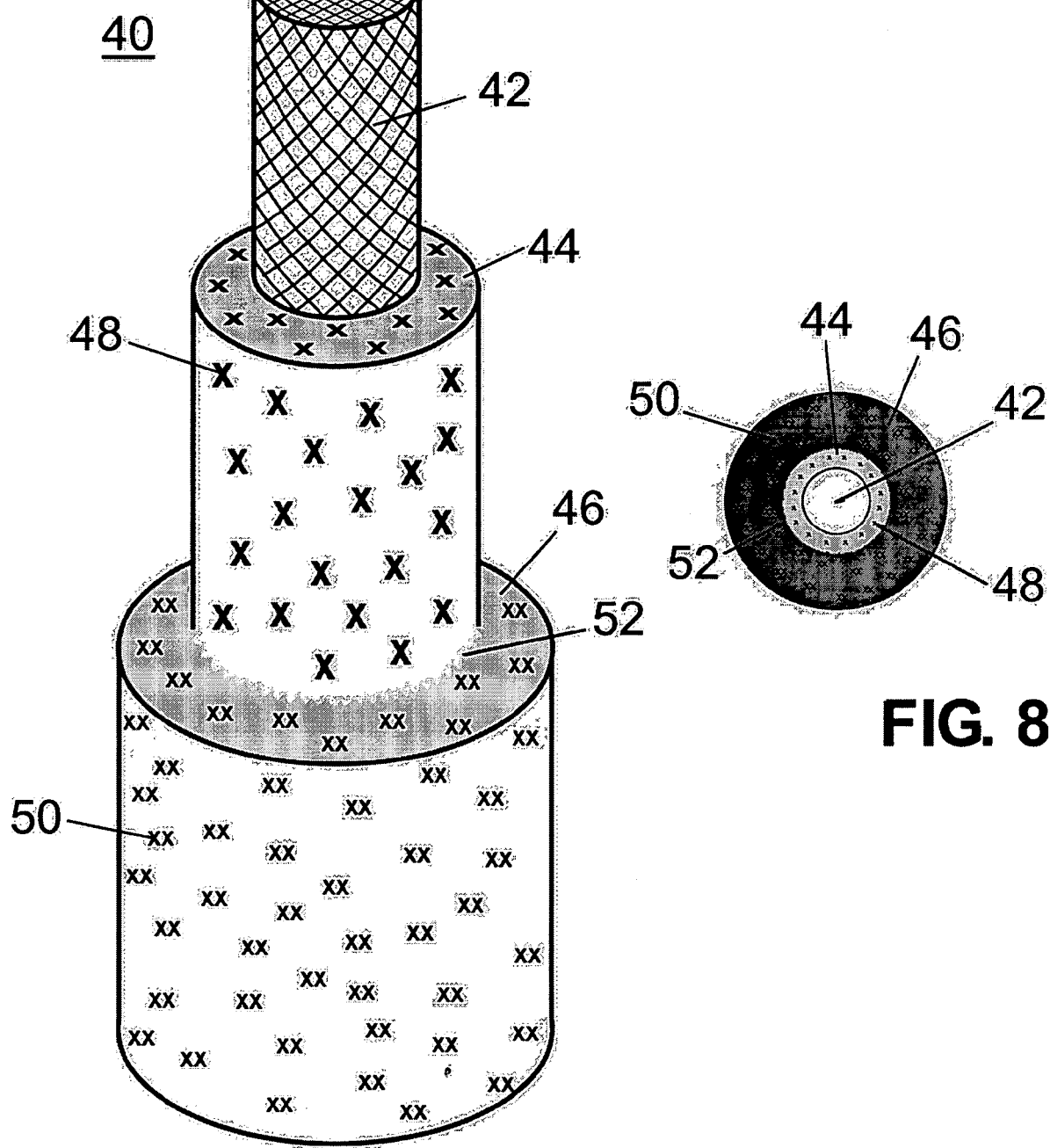
FIG. 7 is a schematic illustration of a fly line in accordance with a third embodiment of the present invention.
FIG. 8 is a schematic illustration showing a cross-sectional view of the fly line shown in FIG. 7.

A fly line in accordance with a third embodiment of the invention is schematically shown in FIGS. 7 and 8. FIG. 7 is a perspective schematic illustration of a fly line 40 shown with various layers partially removed, and FIG. 8 is a cross-sectional view of fly line 40. Like the second embodiment discussed above, fly line 40 has a core 42 and an inner coating 44 containing polymer microspheres 48 (shown as single "X"s in FIGS. 7 and 8). However, fly line 40 of the third embodiment differs from the second embodiment in that outer coating 46 contains polymer microspheres (shown as "XX"s in FIGS. 7 and 8).

During manufacture of fly line 40 of the present invention, inner coating 44 and outer coating 46 are fully cured over core 42 simultaneously, resulting in a fusion interface 52 between the two coatings. However, the two coatings may be disposed and fully cured separately. The process described above with reference to FIG. 5 preferably is utilized to produce fly line 40.

Figure 9:
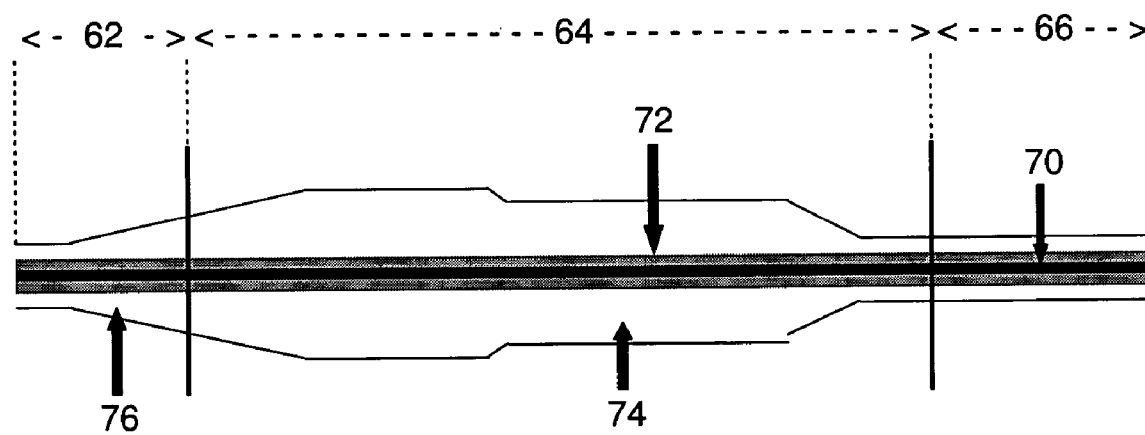
FIG. 9 is a schematic illustration showing an exemplary fly line in accordance with a fourth embodiment of the present invention.

FIG. 9 shows an exemplary fly line in accordance with a fourth embodiment of the present invention. As shown, fly line 60 comprises multiple coatings and includes a floatation tip 62, a body 64 and a running line 66. Fly line 60 includes a core 70, which preferably is nylon monofilament or nylon multifilament and preferably has a diameter of between 0.018 inches an 0.028 inches, generally depending on the size of the line. Both floatation tip 62 and running line 66 preferably have overall diameters between 0.035 inches and 0.045 inches, and body 64 has a preferred diameter of between 0.045 inches and 0.115 inches, generally depending on the size and taper of the line. Fly line 60 includes an inner coating 72 that extends through the floatation tip 62, body 64 and running line 66. Inner coating 72 preferably has a constant thickness of around 0.003 inches and is 0.006 inches larger than the core size independent of line size, taper or core diameter.

In accordance with the present invention, fly line 60 includes coatings comprised of three different types of PVC plastisol mixtures (batches) (for convenience, referred to herein as plastisol mixtures or batches "A", "B" and "C"). Each of the plastisol mixtures "A", "B" and "C" preferably has a Shore A hardness of 80 durometer.

Batch "A" is used as the outer coating 72, which extends along body 64 and running line 66. Batch "B" is used as the outer coating 76, which extends along floating (or "floatation") tip 62. Batch "C" is used as the inner coating 72, which extends along floatation tip 62, body 64 and running line 66.

Batches "B" and "C" incorporate the above-described polymer microspheres and preferably have the same specific gravity of between 0.70 and 0.71. Preferably, batch "B" has a viscosity of 45520 centistokes and batch "C" has a viscosity of 12320 centistokes. Batch "A" incorporates the above-mentioned glass microspheres and preferably has a specific gravity of between 0.87 and 0.88, with a preferred viscosity of around 26080 centistokes. In the illustrative line shown in FIG. 9, running line 66 has a specific gravity of 0.813, body 64 has a specific gravity of 0.832, and floating tip 62 has a specific gravity of 0.668, thus providing an overall specific gravity of line 60 of 0.818.

Below are tables showing the composition of batches "A", "B" and "C" in the illustrative example, where 3M's G/18 microspheres are used as the glass microspheres and the Expancel 091 DE product mentioned above is used as the polymer microspheres.

| Ingredient | Amount | % |
|---|---|---|
| Plastisol Batch "A" | | |
| Density 0.87-0.88 | | |
| Viscosity at 5 RPM: 26000-30000 | | |
| PVC Plastisol | 7500 g | 89.2 |
| Silicone | 225 g | 2.6 |
| Fluorescent Green Dye | 112.2 g | 1.3 |
| Glass Microspheres | 540 g | 6.45 |
| Plastisol Batch "B" | | |
| Density 0.70-0.71 | | |
| Viscosity at 5 RPM: 45000-50000 | | |
| PVC Plastisol | 7000 g | 93.8 |
| Silicone | 35 g | 2.8 |
| Fluorescent Green Dye | 105 g | 1.4 |
| Polymer Microspheres | 143.5 | 1.9 |

-continued

| Ingredient | Amount | % |
|---|---|---|
| Plastisol Batch "C" Density 0.70-0.71 Viscosity at 5 RPM: 10000-15000 | | |
| PVC Plastisol | 7000 g | 93.8 |
| Silicone | 35 g | 2.8 |
| Fluorescent Green Dye | 105 g | 1.4 |
| Polymer Microspheres | 143.5 | 1.9 |

In the exemplary batches shown in the tables above, batch "A" includes PVC Plastisol, 80 Durometer, 39000 Centistokes viscosity equivalent to Lakeside industries JX-288, and liquid silicone with a 100,000 Centistokes viscosity equivalent to Dow Corning DC 200. For batch "B", the PVC plastisol and silicone components are the same as in batch "A." Batch "C" includes PVC plastisol, 80 Durometer, 7200 Centistokes viscosity and the liquid silicone described in batch "A."

As described above, outer coating 74 is made using glass microspheres and thus results in a higher specific gravity of both body 64 and running line 66 as compared to the specific gravity of floating tip 62, which incorporate polymer microspheres in its outer coating 76. However, body 64 and running line 66 includes the coatings as described so as to result in both increased smoothness and increased durability. As for floating tip 62, the use of inner and outer coatings that include polymer microspheres provides for a resultant specific gravity of 0.668, which is significantly lower that that of either body 64 or running line 66. For illustrative purposes, if plastisol batch "B" were made from glass microspheres to produce an outer coating with a specific gravity of between 0.70 and 0.71, greater than 900 grams of glass microspheres (11%) would need needed. The resultant plastisol, however, would have an unacceptable viscosity at 5 RPM of over 200,000 Centistokes.

In each of the embodiments described herein, the fly line coating or coatings must have a specific gravity that is low enough to offset the specific gravity of the core. Nylon monofilament cores are solid and have an effective specific gravity of 1.00 to 1.15. Nylon braided multifilament cores consist of multiple small diameter nylon strands braided around a hollow core and have an effective specific gravity of approximately 0.90. The individual strands in a Nylon braided multifilament core have a specific gravity of 1.00 to 1.15, but since the core is hollow and traps air when the coating is applied, the trapped air reduces the line's overall specific gravity.

Lines having a single coating over a hollow multifilament core will tend to wick water into the hollow core during use, thus increasing the line's specific gravity which in turn causes the line's tip to sink. However, lines manufactured in accordance with the present invention have specific gravities sufficiently low to offset the affect of water being wicked up into the core, thus preventing the line's tip from sinking as water is wicked up during use.

The coatings described above that employ polymer microspheres not only decrease the specific gravity of the fly line, they decrease specific gravity without increasing the fly line's cross sectional area. For conventional fly lines (e.g., having glass microspheres in the coating), the line's specific gravity can be reduced by increasing the volume of glass microspheres to the PVC plastisol, as previously discussed, or by increasing the cross sectional area of the coating. Neither is desired or practical. When cross sectional area is increased, air resistance also is increased which in turn results in a loss of distance when casting.

The multiple coating fly lines discussed above in the second, third and fourth embodiments provide further advantageous features. In addition to providing fly lines that float higher, multiple coats over the core produce a smoother outer surface resulting in a line that is smooth, slick and having a lower coefficient of friction as compared to lines having only a single coating. A lower coefficient of friction results in less friction as the line goes through the rod guides which in turn results in longer casts.

The core of fly lines generally have rough surfaces, especially braided nylon multifilament cores and braided nylon monofilament cores. Lines having only a single coating have higher coefficients of friction, as compared to those with multiple coatings, since the rough surface of the core transfers through the thin cross sections of the line to create a relatively rough surface. The inner coatings described herein fills in the voids in the core and produces a smooth level surface on the core resulting in a smooth surface on the outer coating.

Figure 10:
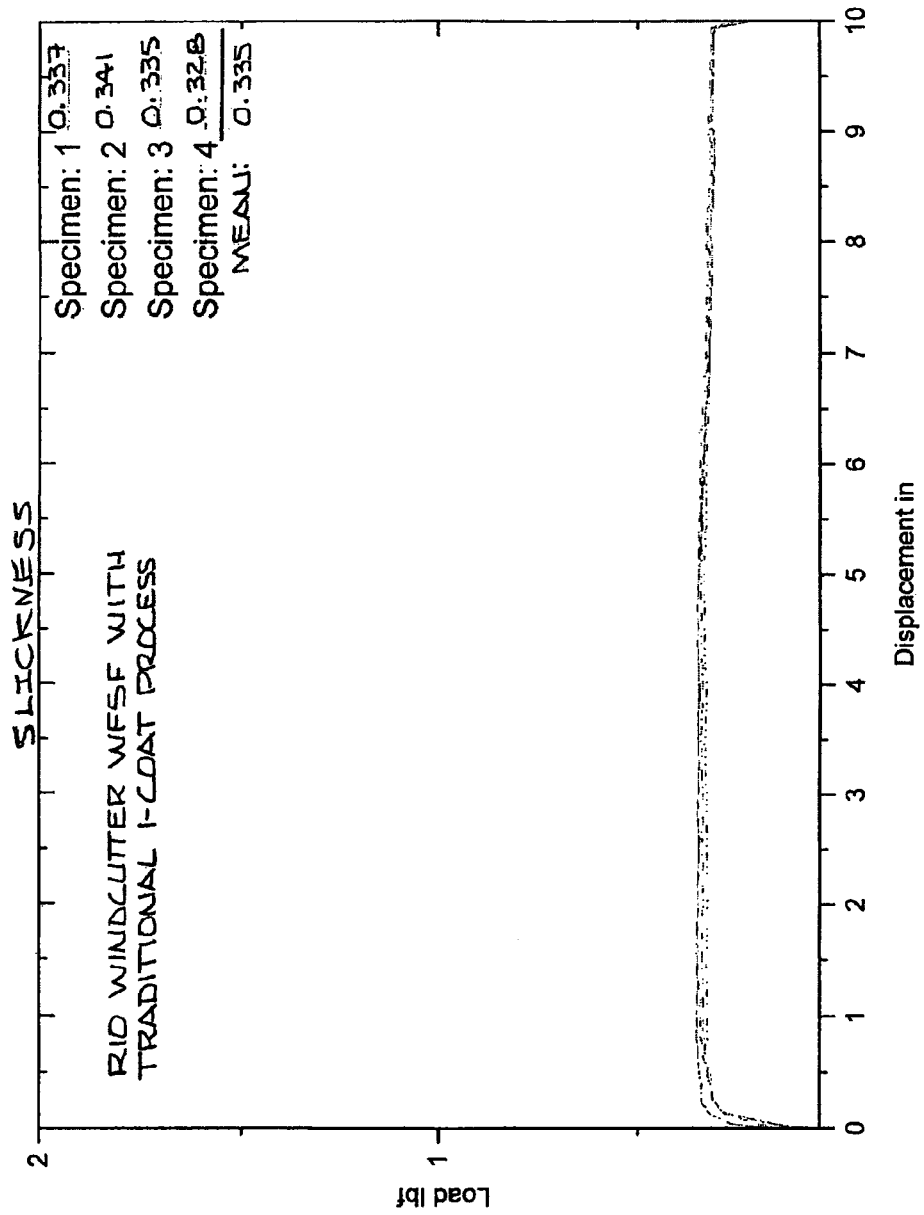
FIG. 10 is a diagram illustrating the slickness of a single coat line.
Figure 11:
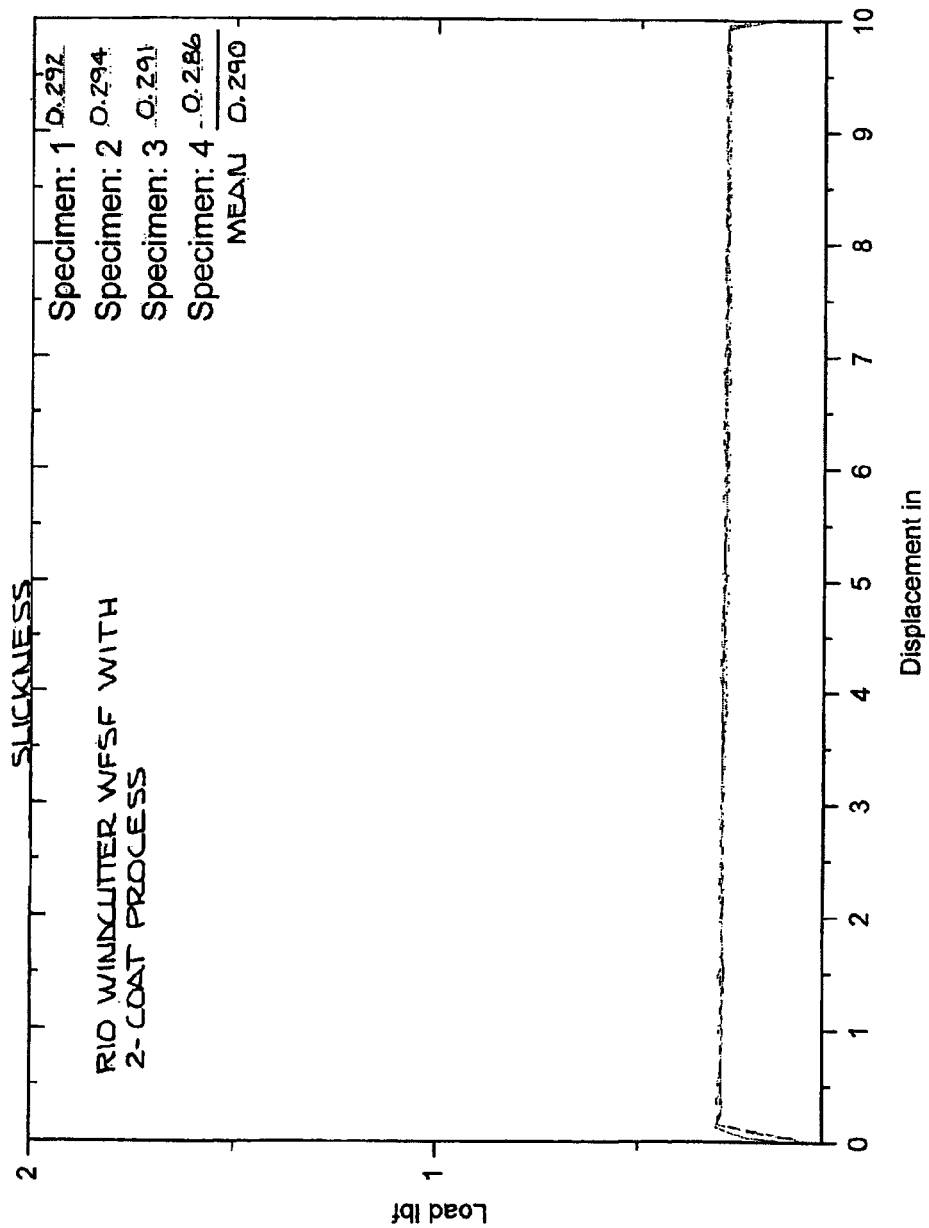
FIG. 11 is a diagram illustrating the slickness of a double coat line.

A fly line with an outer coating having a higher specific gravity (e.g., 0.87) has a smoother surface as compared to a line with an outer coating with a lower specific gravity (e.g., 0.84) due to the use of fewer microspheres in the higher specific gravity line. As the concentration of microspheres increases, more microspheres protrude through the coating's surface thus resulting in a rougher line. By employing an inner coating, the outer coating becomes smoother since the inner coating provides a smooth substrate for the outer coating. A smoother outer coating can also be achieved by increasing the durometer of the outer coating but doing so also increases its hardness and its resistance to bending and thus reduces the suppleness of the line. As is well known, a smoother and slicker (i.e., lower coefficient of friction) line can be cast further. FIGS. 10 and 11 illustrate the slickness of a single coat line and a double coat line, respectively, manufactured as herein described.

Slickness (coefficient of friction) is a comparative test, and testing may be achieved as follows: Using an Instron Model 4443 Tensile Tester with a 10 Kilogram load cell, a section of fly line 0.050 inches in diameter with a 0.123 pound weight attached to one end is drawn over a 7 inch diameter chrome plated wheel at a rate of 10 inches per minute by the Instron. The line has a surface contact length of 22 inches to the wheel. As the line is drawn across the wheel, the Instron measures the amount of force required to pull the line over the wheel. A slick line requires less force to pull over the wheel as compared to a rough line. Four tests were conducted on each line and are identified in FIGS. 10 and 11 as specimens 1-4. The numerical value identified adjacent to each specimen number is the force in pounds required to pull the line over the wheel, the mean being the average of the four tests. To determine the force, the 0.123 weight is subtracted from the mean. For example, 0.335-0.123=0.212 pounds for the single coat line (FIG. 10) and 0.290-0.123=0.167 pounds for the double coat line (FIG. 11). Effectively, the double coat line has a coefficient of friction that is 21% less than the single coat line.

The centering of the core in the fly line coating also is important to the durability and structural integrity of the line. If the core is not centrally located in the cross section of the line, the coating will be thin on one side of the core and thick on the other side of the core. The side where the coating is thin will be deteriorated by the friction created by the rod guides prematurely due to the reduced cross section of the coating. The roundness of the core affects centering. If the core is not round, centering the core within the cross section of the coating in manufacturing is difficult. The inner coating enhances the roundness of the core thus making centering easier and subsequently increasing durability. Moreover, due to the existence of the outer coating, the inner coating can be variable in thickness without degrading the quality of the fly line.

The present invention has been described in accordance with particular embodiments as described herein, as well as variations thereof. However, it is intended that the appended claims be interpreted as including the embodiments described herein, the alternatives mentioned above, and all equivalents thereto.

What is claimed is:

1. A fishing line, comprising:
   a core;
   a first coating disposed around the core, the first coating having a plurality of polymer microspheres; and
   a second coating disposed around the first coating,
   the core including first and second core portions, the first coating disposed around both the first and second core portions, the second coating disposed around that portion of the first coating that is disposed around the first core portion; the fishing line including a third coating disposed around that portion of the first coating that is disposed around the second core portion, the second and third coatings having microspheres made of different materials.

2. The fishing line of claim 1, wherein the second coating has a plurality of polymer microspheres, and the third coating includes a plurality of glass microspheres.

3. The fishing line of claim 1, wherein one of the second and third coatings includes a plurality of polymer microspheres, and a viscosity of said one of the second and third coatings is different from a viscosity of the first coating.

4. A fishing line comprising:
   a core;
   a first coating disposed around the core, the first coating having a plurality of polymer Microspheres; and
   a second coating disposed around the first coating, the second coating being a PVC plastisol, and
   the fishing line has a slickness corresponding to, as measured using a tensile tester with a 10 kilogram load cell, less than 0.3 pounds of force required to pull a .05 inch diameter fishing line having a 0.123 pound attached weight over a 7 inch diameter chrome plate wheel at a rate of 10 inches per minute, the line having a surface contact length of 22 inches to the wheel.

* * * * *